US010626922B2

(12) United States Patent
Meier et al.

(10) Patent No.: US 10,626,922 B2
(45) Date of Patent: Apr. 21, 2020

(54) LOW-FRICTION, ABRASION RESISTANT REPLACEABLE BEARING SURFACE

(71) Applicant: Extreme Technologies, LLC, Vernal, UT (US)

(72) Inventors: Gilbert Troy Meier, Vernal, UT (US); Joseph Aschenbrenner, Blackfoot, ID (US); Joshua J. Smith, Vernal, UT (US); Lane Snell, Wheat Ridge, CO (US)

(73) Assignee: Extreme Technologies, LLC, Vernal, UT (US)

( * ) Notice: Subject to any disclaimer, the term of this patent is extended or adjusted under 35 U.S.C. 154(b) by 0 days.

(21) Appl. No.: 16/266,575

(22) Filed: Feb. 4, 2019

(65) Prior Publication Data

US 2019/0301536 A1    Oct. 3, 2019

Related U.S. Application Data

(63) Continuation-in-part of application No. 15/336,226, filed on Oct. 27, 2016, now abandoned, which is a
(Continued)

(51) Int. Cl.
*F16C 43/02* (2006.01)
*F16C 33/04* (2006.01)
*F16C 33/08* (2006.01)

(52) U.S. Cl.
CPC ............ *F16C 43/02* (2013.01); *F16C 33/043* (2013.01); *F16C 33/08* (2013.01); *F16C 2206/04* (2013.01); *F16C 2237/00* (2013.01)

(58) Field of Classification Search
CPC ........ F16C 33/043; F16C 33/26; F16C 43/02; F16C 2240/40; F16C 2206/04; F16C 2226/60; E21B 4/003
(Continued)

(56) References Cited

U.S. PATENT DOCUMENTS 3,237,705 A * 3/1966 Williams, Jr. .......... E21B 10/26
175/406
5,372,351 A * 12/1994 Oliver ................... F16K 31/055
251/129.03
(Continued)

FOREIGN PATENT DOCUMENTS

EP           219959    *  4/1987
WO    WO2008026011    *  3/2008

OTHER PUBLICATIONS

Final Office Action dated Aug. 3, 2018 in U.S. Appl. No. 15/336,226.
(Continued)

*Primary Examiner* — James Pilkington
(74) *Attorney, Agent, or Firm* — Ramey & Schwaller, LLP; William P. Ramey; Craig Buschmann

(57) ABSTRACT

A system includes a device with at least one recess with a wall. The at least one recess includes a first hole with a first diameter. At least one bearing surface is configured to be inserted into and removed from the at least one recess. The at least one bearing surface includes a second hole with a second diameter that is less than the first diameter. At least one cross-pin is configured to be positioned within the first hole and the second hole. At least one washer is positioned within the recess provides a biasing force to urge the bearing surface upward.

19 Claims, 7 Drawing Sheets

Related U.S. Application Data continuation-in-part of application No. 14/746,119, filed on Jun. 22, 2015, now Pat. No. 9,488,229, which is a continuation-in-part of application No. 14/018,066, filed on Sep. 4, 2013, now abandoned.

(60) Provisional application No. 61/696,738, filed on Sep. 4, 2012.

(58) Field of Classification Search
USPC .............................. 384/92, 95, 282, 284, 285
See application file for complete search history.

(56) References Cited

U.S. PATENT DOCUMENTS

| | | | |
|---|---|---|---|
| 6,257,279 B1* | 7/2001 | Peltz | F16K 11/074 137/625 |
| 6,607,371 B1* | 8/2003 | Raymond | F01C 1/34 418/11 |
| 6,695,080 B2* | 2/2004 | Presley | E21B 10/16 175/391 |
| 6,920,944 B2* | 7/2005 | Eppink | E21B 10/325 175/53 |
| 6,973,974 B2* | 12/2005 | McLoughlin | E21B 23/006 166/386 |
| 6,991,046 B2* | 1/2006 | Fielder | E21B 10/322 175/57 |
| 7,901,137 B1* | 3/2011 | Peterson | F16C 17/02 175/403 |
| 8,118,117 B2* | 2/2012 | Ide | E21B 4/003 175/107 |
| 8,146,687 B1* | 4/2012 | Vail | B01J 3/062 175/420.2 |
| 8,651,743 B2* | 2/2014 | Peterson | F16C 17/06 384/306 |
| 9,255,605 B2* | 2/2016 | Peterson | F16C 17/06 |
| 2012/0057814 A1* | 3/2012 | Dadson | E21B 4/003 384/129 |

OTHER PUBLICATIONS

Non-Final Office Action dated Mar. 7, 2018 in U.S. Appl. No. 15/336,226.

Non-Final Office Action dated May 13, 2016 in U.S. Appl. No. 14/746,119.

* cited by examiner

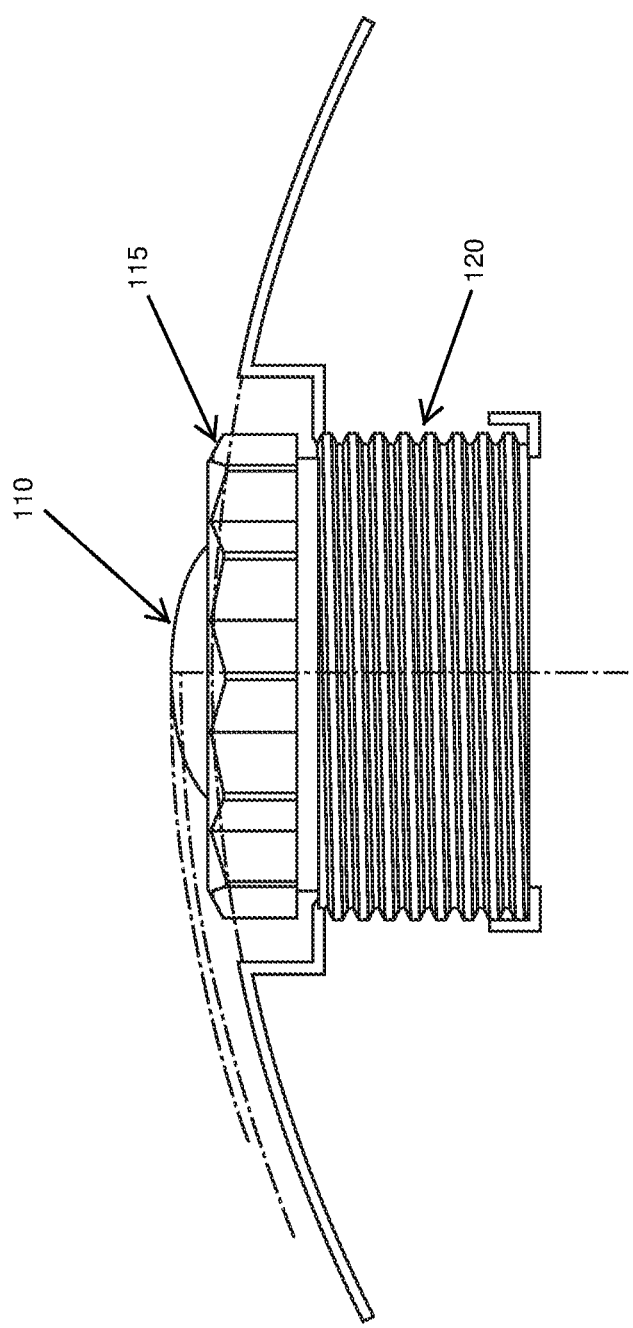

SECTION A-A

SECTION C-C

LOW-FRICTION, ABRASION RESISTANT REPLACEABLE BEARING SURFACE

PRIORITY CLAIM

This application is a continuation-in-part of U.S. Non-Provisional application Ser. No. 15/336,226, filed Oct. 27, 2016, and entitled "LOW-FRICTION, ABRASION RESISTANT REPLACEABLE BEARING SURFACE," which is a continuation-in-part of U.S. Non-Provisional application Ser. No. 14/746,119, filed Jun. 22, 2015, and entitled "LOW-FRICTION, ABRASION RESISTANT REPLACEABLE BEARING SURFACE" and issued as U.S. Pat. No. 9,488,229 on Nov. 8, 2016, which is a continuation-in-part of U.S. Non-Provisional application Ser. No. 14/018,066, filed Sep. 4, 2013, and entitled "LOW-FRICTION, ABRASION RESISTANT REPLACEABLE BEARING SURFACE," which claims the benefit of and priority to U.S. Provisional Application Ser. No. 61/696,738, filed Sep. 4, 2012, and entitled "LOW-FRICTION, ABRASION RESISTANT REPLACEABLE BEARING SURFACE," all of which are specifically and entirely incorporated by reference.

TECHNICAL FIELD

The invention is directed to friction reducing devices. In particular, the invention is directed to low-friction, abrasion resistant replaceable friction reducing bearing surfaces.

BACKGROUND

Many industries, including but not limited to oil well drilling, machining, mining, quarrying, and transportation, use mechanisms that need to work under high pressure and high temperature conditions. Furthermore, parts of the mechanisms often rub against each other or external surfaces and, therefore, a low friction, abrasion resistant surface in these parts is desired.

One solution, for example, is a bearing surface comprised of Polycrystalline Diamond Compact (PDC), a synthetic diamond that performs under harsh conditions. PDC is diamond grit that has been fused together under high-pressure, high-temperature conditions in the presence of a catalytic metal. The extreme hardness, wear resistance, and thermal conductivity of diamond make it an ideal material for bearings. Individual diamond crystals cleave quite easily when struck parallel to certain planes (the process used to facet diamond gemstones takes advantage of these relatively weak planes). Diamond sintering overcomes the problem of weak planes in diamond gemstones by bonding a mass of small diamond particles onto a larger, coherent structure. Sintered diamond provides greater toughness and durability than single crystals because the individual crystals in a sintered body are randomly oriented. This prevents cracks from propagating along the weak planes where traditional diamond crystals cleave most easily. Sintered diamonds also provide more uniform wear than a single crystal, while maintaining similar thermal conductivity and hardness properties. All of these factors combine to make sintered diamond the ideal material for many bearing applications.

However, overtime, PDC bearings do wear out and can become damaged from intensive use. The PDC bearings are usually embedded into the device by welding and, therefore, in order to replace the PDC bearings, the parts must be removed from operation and transported to a specialized facility that is able to remove the worn out PDC bearings and replace them with new bearings. The process is both costly and time consuming. Furthermore, the repeated heating and cooling needed to replace the bearings causes excessive stress on the devices. Additionally, the welded or brazed bearing pads currently used during refurbishment cannot maintain precision tolerances, especially after multiple replacements. Therefore, it is desirable to have a replaceable low-friction, abrasion resistant bearing surface capable of being replace quickly on-site.

In some applications, the need for a larger diameter bearing surface makes the use of use of PDC bearings prohibitive. One such application is as a stand-off to hold the cutters of a reamer off the casing string while drilling out a shoe. In this application, the life of the bearing surface needs to be greater than the time during which the reamer is rotated inside the casing. However, it is not practical to transport the tool to a central shop for replacement of the bearing surface after each run. The use of cheaper materials, such as tool steel, Teflon, nylon, etc., which are capable of surviving a single pass in the well bore become practical in this application when a field replaceable retention system is employed.

SUMMARY

The present invention overcomes the problems and disadvantages associated with current strategies and designs and provides new tools and methods of providing replaceable low-friction, abrasion resistant bearing surfaces.

One embodiment of the invention is directed to a replaceable bearing surface. The replaceable bearing surface comprises an outer housing and a low-friction, abrasion resistant button secured within the outer housing. The outer housing is adapted to be inserted into and removed from a device without damaging the device.

In the preferred embodiment, the button is comprised of Polycrystalline Diamond Compact (PDC). Preferably, the outer housing is comprised of 41/30 steel. The button is preferably press fit into the outer housing. Preferably, the outer housing has a notched grip portion and the outer housing has a threaded portion. The threaded portion of the outer housing is preferably adapted to mate with a threaded recess in the device.

In the preferred embodiment, the button is hemispherical. Preferably, the outer surface of the button extends beyond at least one surface of the outer housing. Preferably, when installed, button extends beyond an exterior surface of the device.

Another embodiment of the invention is directed to a low-friction, abrasion resistant system. The system comprises a device having at least one recess, a plurality of replaceable bearing surfaces adapted to be inserted into and removed from the at least one recess without damaging the device, each replaceable bearing surface comprising an outer housing, and a low-friction, abrasion resistant button secured within the outer housing.

Preferably, the button is comprised of Polycrystalline Diamond Compact (PDC). In the preferred embodiment, the outer housing is comprised of 41/30 steel. Preferably, the button is press fit into the outer housing. In the preferred embodiment, the outer housing has a notched grip portion and a threaded portion. Preferably, the threaded portion of the outer housing is adapted to mate with a threaded recess in the device.

Preferably, the button is hemispherical. Preferably, the outer surface of the button extends beyond at least one surface of the outer housing. In the preferred embodiment, when installed, button extends beyond an exterior surface of the device. The device is preferably one of a drill bit, a reamer, a cam shaft, a bearing, or an axle.

Another embodiment of the invention is directed to a method of installing and removing a replaceable bearing surface without damaging the device.

Another embodiment of the system includes a device with at least one recess with a wall. The at least one recess includes a first hole with a first diameter. At least one bearing surface is configured to be inserted into and removed from the at least one recess. The at least one bearing surface includes a second hole with a second diameter that is less than the first diameter. At least one cross-pin is configured to be positioned within the first hole and the second hole. At least one washer is positioned within the recess provides a biasing force to urge the bearing surface upward. A surface of the least one cross-pin is configured to at least one of a) not contact and b) just contact a bottom surface of the first hole of the device when a force is applied to the bearing surface. The biasing force of the washer urges a surface of the at least one cross-pin into contact with a top surface of the first hole of the device when no force is applied to the bearing surface. Optionally, the cross-pin is one of a spiral pin, spring pin, and a roll pin.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 3 is a cut-away view of an embodiment of the bearing surface of the invention;

FIG. 4 is a side view of an embodiment of the bearing surface installed in a device;

The drawings are not necessarily to scale.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

The terms "up" and "down"; "upper" and "lower"; "upward" and downward"; "above" and "below"; and other like terms as used herein refer to relative positions to one another and are not intended to denote a particular direction or spatial orientation or perspective view A problem in the art capable of being solved by the embodiments of the present invention is replacing worn out bearing surfaces quickly and on-site. It has been surprisingly discovered that providing a replaceable low-friction, abrasion and impact resistant bearing surface allows technicians to replace worn out bearing surfaces themselves without transporting the device to a specialty facility.

Figure 1:
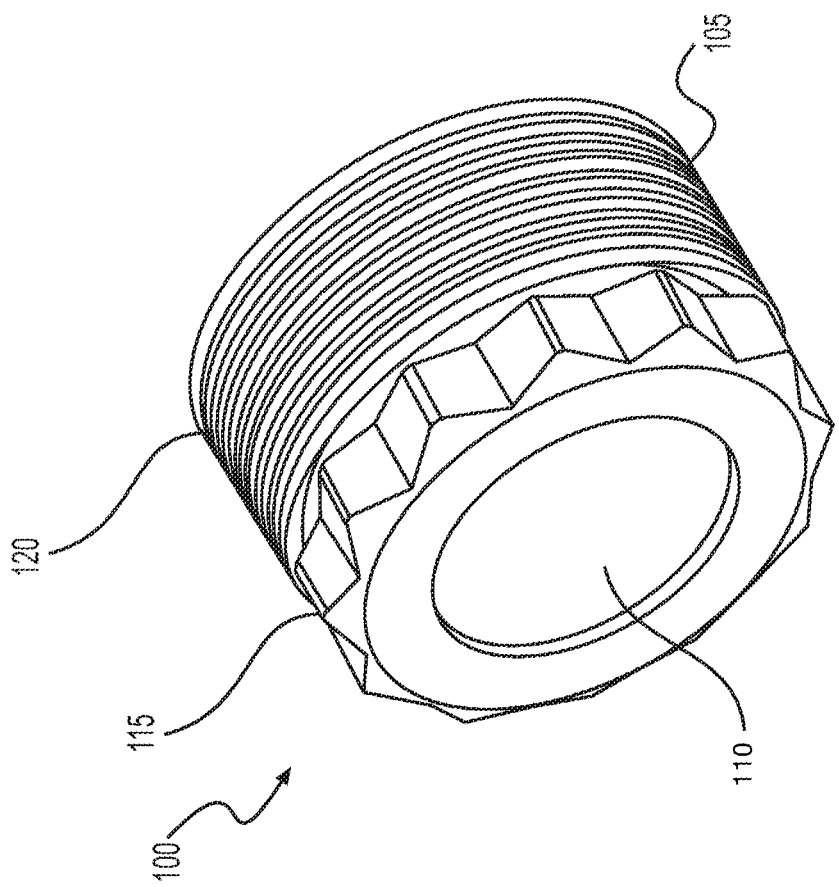
FIG. 1 is an isometric view of an embodiment of the bearing surface of the invention.

FIG. 1 depicts an isometric view of a preferred embodiment of the replaceable bearing surface 100. Bearing surface 100 is comprised of an outer housing 105 and a slider button 110. While one slider button 110 is shown, another number of slider buttons can be used, for example, two or four slider buttons can be used. Preferably, the slider button 110 is a PDC, which has a lower coefficient of friction that carbide or hardened steels. The low coefficient of friction reduces drag during use of the device and thus reduces torque, for example, during drilling of lateral well bores. However, other materials, such as aluminum oxide, silicon carbide, or cubic boron nitride can be used. In the preferred embodiment, slider button 110 is semi-spherical, however other shapes (for example, rectangular, triangular, or semi-ovoidal) can be implemented. Additionally, slider button 110 can be a combination of shapes. Slider button 110 is preferably press fit into outer housing 105. However, slider button 110 can be coupled to outer housing 105, for example, with bolts, screws, adhesive, other fastening devices, or screwed into outer housing 105.

Figure 2:
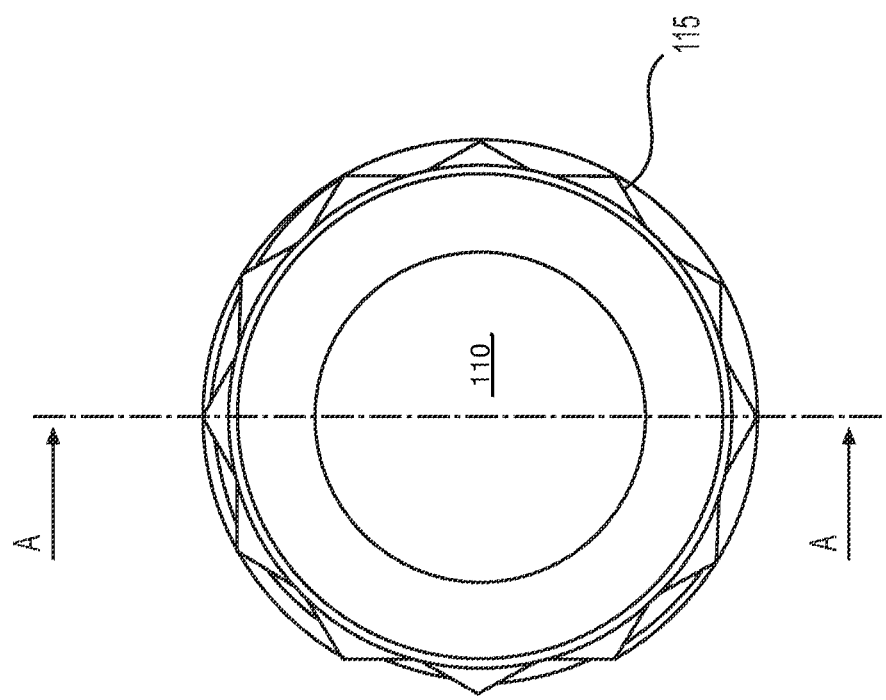
FIG. 2 is a top view of an embodiment of the bearing surface of the invention.

Preferably, outer housing 105 is comprised of 41/30 steel, however other steels or other materials can be used for outer housing 105. For example, nylon, other metals, plastics, carbon-fiber, or other naturally occurring or manmade materials. As can be seen in FIG. 2, outer housing 105 is preferably cylindrical, having an outer diameter of about one inch. However, outer housing 105 can have other dimensions depending on the device into which bearing surface 100 is installed. For example, outer housing 105 can have a diameter of ½ an inch, 2 inches, or 3 inches. Outer housing 105 preferably has a notched portion 115 on the outer diameter, adjacent to slider button 110. Notched portion 115 is preferably adapted to be griped by a wrench, pliers, or a person's fingers. Notched portion 115 preferably aids in installing and uninstalling bearing surface 110 by providing a gripable surface. Outer housing 105 can additionally have other gripping surfaces or a smooth surface. For example, outer housing 105 can have raised knurling, a rubberized grip, or other high friction surfaces.

FIG. 3 depicts a cut-away side view of bearing surface 100. Outer housing 105 additionally preferably comprises a threaded portion 120. Threaded portion 120 preferably is able to mate with a threaded socket in the apparatus into which bearing surface 100 is to be installed. In other embodiments, instead of or in addition to treaded portion 120, outer housing 105 may have a spring biased cam, a friction increasing device, a pin, adhesive, or another fastening device to keep bearing surface 100 from unintentionally coming out of the apparatus. Preferably, the coupling device is capable of maintaining the outer housing 105 within the apparatus during use of the apparatus and under high stress and high heat conditions.

As shown in FIG. 4, bearing surface 100 is couplable with a device or apparatus. In the preferred embodiment the bearing surface 100 is counter sunk into the device so that only a portion of the bearing surface 100 extends beyond the exterior or the device. For example, only the slider button 110 may extend beyond the exterior of the device. The device can be a drill bit, a reamer, a cam shaft, a bearing, an axle, another machine part, or any other device requiring a low-friction surface. Preferably, the device has a recess with threaded sides that mates with threaded portion 120 of outer housing 105. In embodiments where outer housing 105 has another fixation device, the recess may have other mating devices. Preferably, the bearing surface 100 can be replaced at the location of use of the device with common tools (for example wrenches, pliers, or screw drivers). Preferably, the bearing surface 100 can be replaced without heating and/or cooling the device, thereby reducing the stress on the device caused during the refurbishment techniques used previously. Additionally, the precision tolerances of the devices can be maintained and repeated during replacement of the bearing surface 100. Since the bearing surface 100 can preferably be replaced on-site, a transportation cost savings is realized by reducing the number of trips to repair centers. Furthermore, redundant inventory can be reduced since the time previously necessary for shipping and repair is eliminated.

Figure 5A:
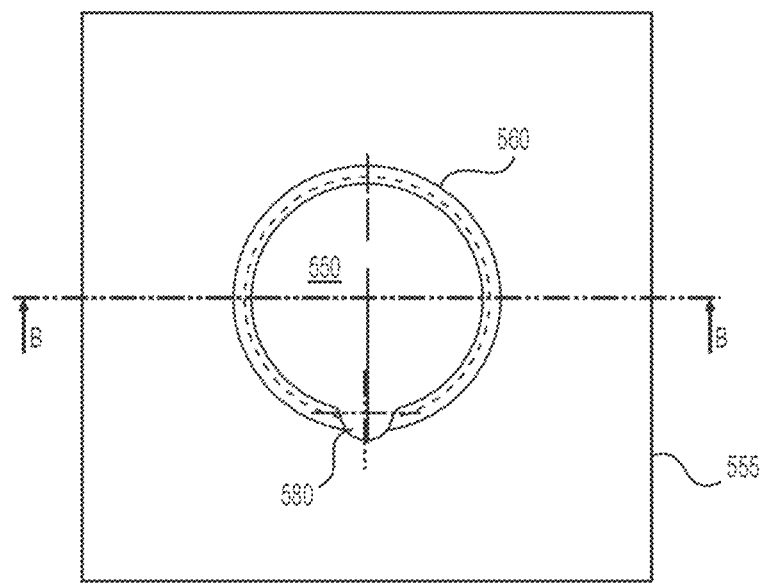
FIG. 5A-B depict a top and cutaway side view of an embodiment of recess in a device adapted to receive bearing surfaces.
Figure 5B:
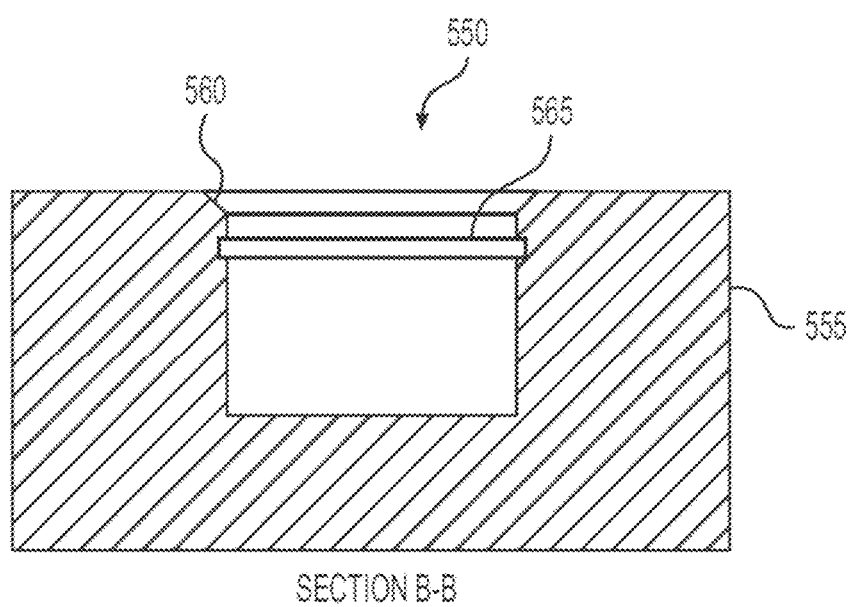

FIGS. 5A-B, 6A-B, 7A-B, and 8A-B depict embodiments of the bearing surface using a snap ring retention device. FIG. 5A is a top view of a recess 550 in a device 555 and FIG. 5B is the cutaway side view thereof. Device 555 can be drill bit, a reamer, a cam shaft, a bearing, an axle, another machine part, or any other device requiring a low-friction surface. Preferably, recess 550 has a cylindrical shape with a flared opening 560. However, recess 550 can have another shape. For example, recess 550 can be semispherical, pyramidal, cubical, or conical. Preferably, a portion of the inner surface of recess 550 is grooved 565. Preferably, groove 565 extends into the body of device 555. In a preferred embodiment, the flared opening 560 of recess 550 may extend further into the body of device 555 than the groove 565 extends. However, in other embodiments the flared opening 560 may be smaller or equal in size to groove 565. Preferably, groove 565 is positioned within the outer third of recess 565. However, groove 565 can have another positioning.

Figure 6A:
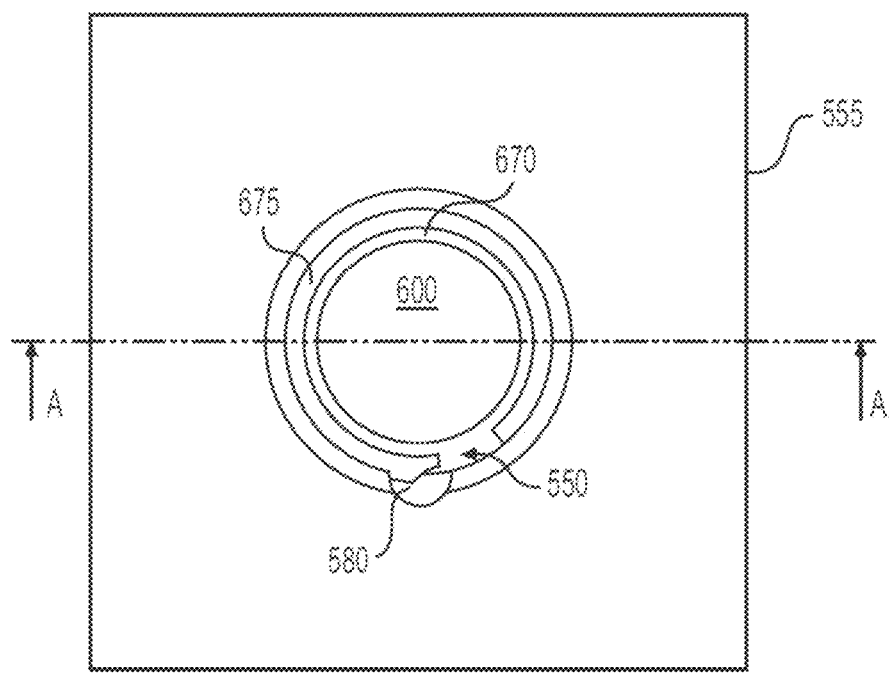
FIG. 6A-B depict a top and cutaway side view of an embodiment of a bearing surface placed within the recess depicted in FIGS. 5A-B.
Figure 6B:
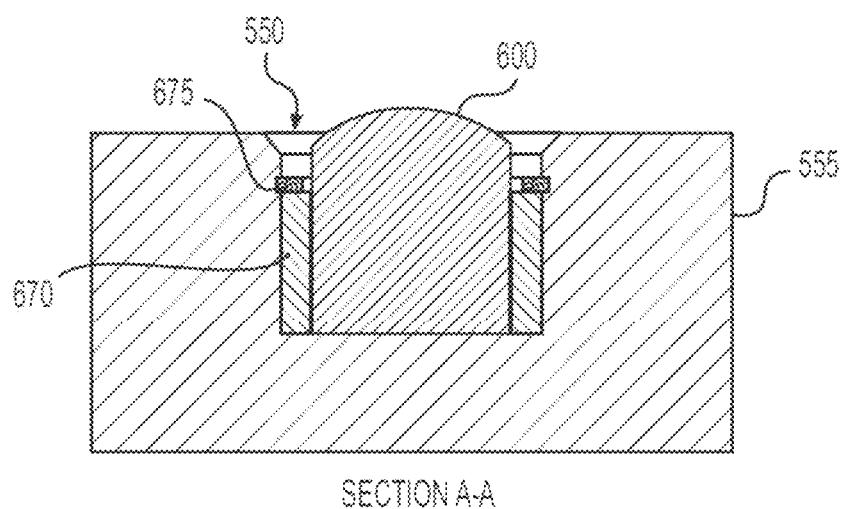

FIG. 6A is a top view of recess 550 with bearing surface 600 placed therein and FIG. 6B is a cutaway side view thereof. Bearing surface 600 may be a PDC, an impact resistant steel, or another material with a low coefficient of friction. Preferably, the coefficient of friction of bearing surface 600 is lower than the coefficient of friction of the material of device 555. Preferably bearing surface 600 is cylindrical in shape with a domed outer surface. However, bearing surface 600 can have another shape, for example spherical, semispherical, cubical, conical, or another shape. Furthermore, bearing surface may have a flat, chamfered, beveled, or other shaped outer surface. Preferably, bearing surface 600 is contained within a collar 670. Collar 670 can be of the same material as bearing surface 600, the same material as device 555, or of another material. Preferably, bearing surface 600 is press fit into collar 670. However, bearing surface 600 and collar 670 can be coupled using a different method, for example, adhesive, welding, a threaded coupling, pins, screws, bolts, or another fastening device. Preferably, the outer diameter of collar 670 is slightly smaller than the inner diameter of recess 550 so that when collar 670 and bearing surface 600 are placed within recess 550 they do not move freely. Preferably, once placed within recess 550, bearing surface 600 extends beyond the outer surface of device 555. Preferably, collar 670 extends a portion of the way up bearing surface 650. Preferably, the height of collar 670 is equal to the height of groove 565 such that when collar 670 and bearing surface 600 are placed within recess 550 the upper surface of collar 670 is adjacent to groove 565.

A snap ring 675 is preferably inserted over collar 670 and into groove 565 to retain collar 670 and bearing surface 600 in recess 550. Snap ring (or retaining ring) 675 is preferably a removable device that can be squeezed into recess 550 and then extend into groove 565 such that a portion of snap ring 675 is within groove 565 and a portion of snap ring 675 extends over collar 670. In other embodiments, collar 670 can be held into recess 550 by a spring-loaded cam, a pin, a screw, adhesive, a clevis, or another fastening device. Additionally recess 550 may have an opening 580 by which snap ring 675 can be squeezed for insertion and removal. In the preferred embodiment, to replace bearing surface 600, snap ring 675 is removed, the broken or used bearing surface 600 and collar 670 are then removed. A new bearing surface 600 and collar 670 are inserted into recess 550 and snap ring 675 (either the original or a replacement) is inserted into groove 565.

Figure 7A:
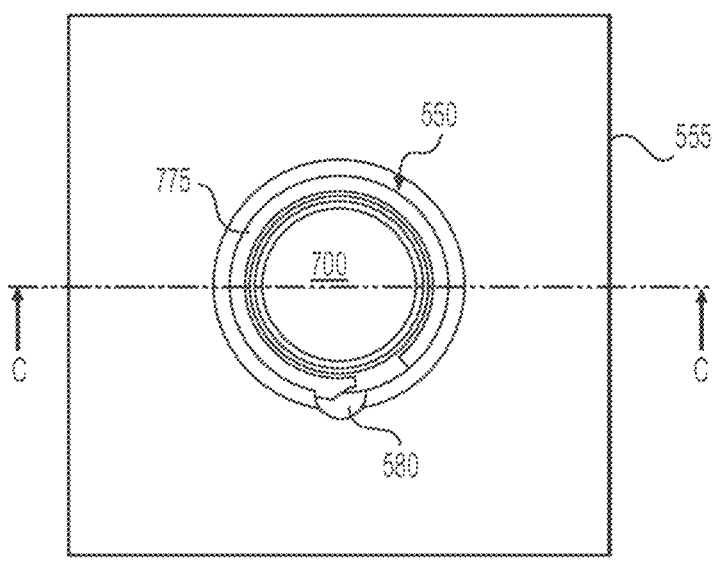
FIG. 7A-B depict a top and cutaway side view of another embodiment of a bearing surface placed within the recess depicted in FIGS. 5A-B.
Figure 7B:
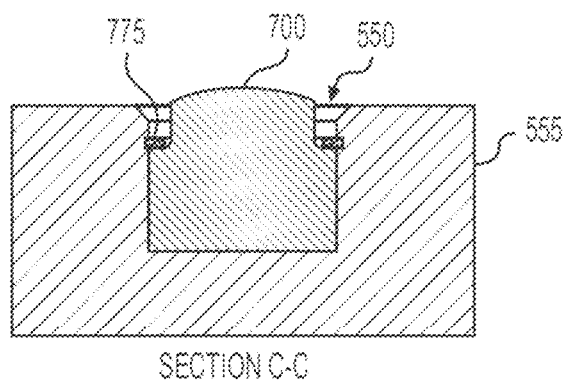
Figure 8A:
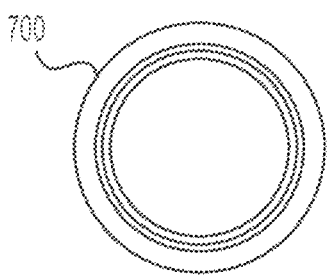
FIG. 8A-B depict a top and side view of the embodiment of the bearing surface depicted in FIGS. 7A-B.
Figure 8B:
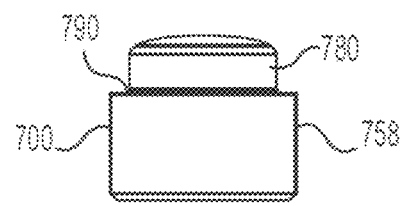

FIG. 7A is a top view of recess 550 with bearing surface 700 placed therein and FIG. 7B is a cutaway side view thereof. FIGS. 8A and 8B are top and side views of bearing surface 700. Bearing surface 700 may be a PDC, an impact resistant steel, or another material with a low coefficient of friction. Preferably, the coefficient of friction of bearing surface 700 is lower than the coefficient of friction of the material of device 555. Preferably, bearing surface 700 is a single unit that is cylindrical in shape with an upper portion 780 has a smaller radius than the lower portion 785. Preferably, the outer surface of upper portion 780 is domed. However, bearing surface 600 can have another shape, for example spherical, semispherical, cubical, conical, a combination thereof, or another shape. Furthermore, bearing surface may have a flat, chamfered, beveled, or other shaped outer surface. Preferably, there is a transition zone 790 between the upper portion 780 and the lower portion 785. Preferably, the outer diameter of lower portion 785 is slightly smaller than the inner diameter of recess 550 so that when bearing surface 700 is placed within recess 550 it does not move freely. Preferably, once placed within recess 550, bearing surface 700 extends beyond the outer surface of device 555. Preferably, the height of lower portion 785 is equal to the height of groove 565 such that when bearing surface 700 is placed within recess 550 the upper surface of lower portion 785 is adjacent to groove 565. In a preferred embodiment, upper portion 780 is milled from lower portion 785. However, upper portion 780 and lower portion 785 can be formed in different methods, for example, 3D printed, molded, etched, lathed, or a different technique.

A snap ring 775 is preferably inserted over lower portion 785 and into groove 565 to retain bearing surface 700 in recess 550. Snap ring (or retaining ring) 775 is preferably a removable device that can be squeezed into recess 550 and then extend into groove 565 such that a portion of snap ring 775 is within groove 565 and a portion of snap ring 775 extends over lower portion 785. In other embodiments, lower portion 785 can be held into recess 550 by a spring-loaded cam, a pin, a screw, adhesive, a clevis, or another fastening device. Additionally, recess 550 may have an opening 580 by which snap ring 775 can be squeezed for insertion and removal. In the preferred embodiment, to replace bearing surface 700, snap ring 775 is removed, the broken or used bearing surface 700 is then removed. A new bearing surface 700 is inserted into recess 550 and snap ring 775 (either the original or a replacement) is inserted into groove 565.

Figure 9:
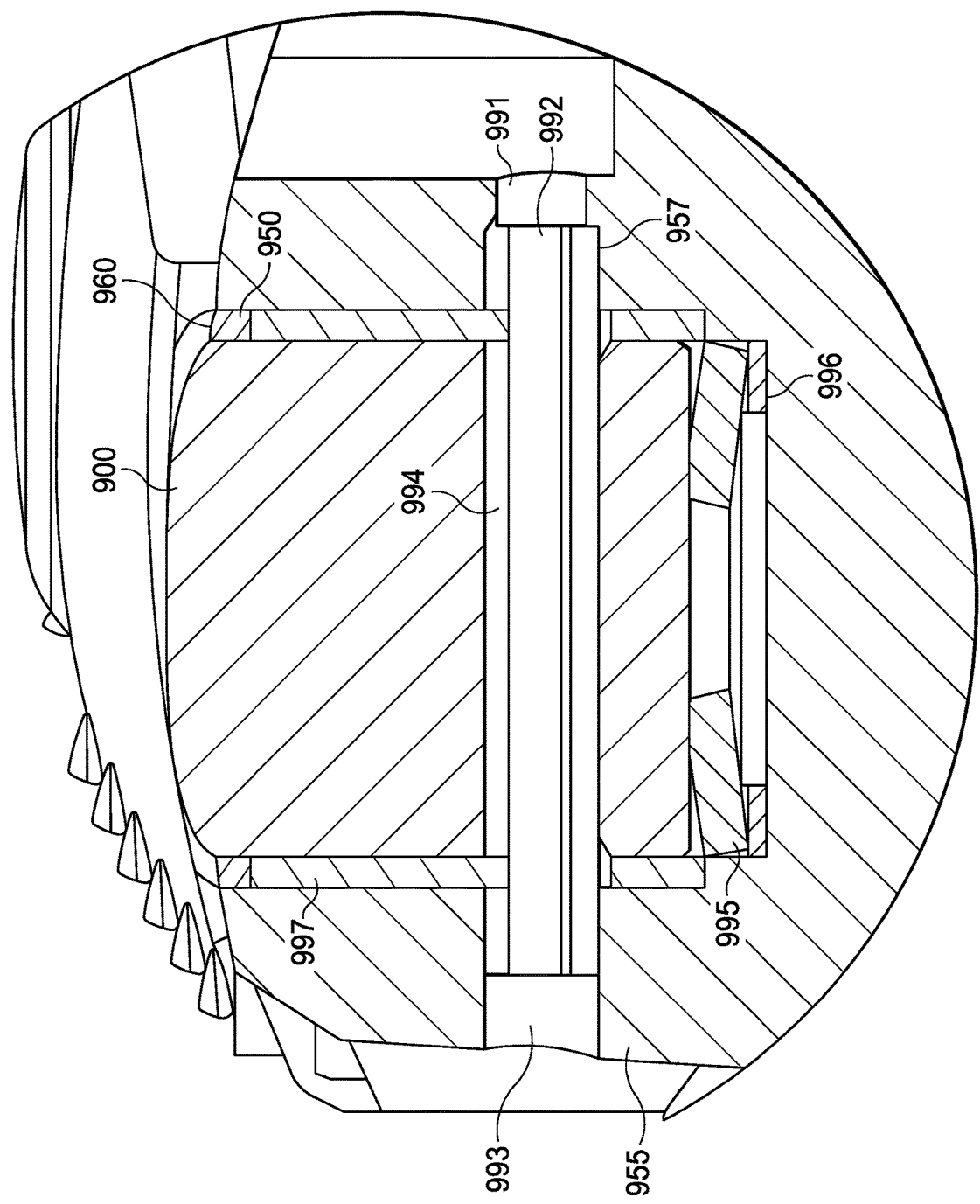
FIG. 9 depicts a cutaway side view of another embodiment of a bearing surface of the invention, and, FIG. 10 depicts an embodiment of the embodiment of the bearing surface in FIG. 9.

FIG. 9 depicts another embodiment of a bearing surface 900 held into recess 950 in device 955 with a cross-pin 992. Device 955 can be drill bit, a reamer, a cam shaft, a bearing, an axle, another machine part, or any other device requiring a low-friction surface. Preferably, recess 950 has a cylindrical shape with a flared opening 960. However, recess 950 can have another shape. For example, recess 950 can be semispherical, pyramidal, cubical, or conical. In the preferred embodiment, after bearing surface 900 is placed within recess 950, cross-pin 992 is threaded through a hole 993 in the side of device 955 that is perpendicular to recess 950, through a corresponding hole 994 in bearing surface 900, and into a cavity 991 in the wall of recess 950 that may be opposite the hole 993. Preferably, cross-pin 992 slides in and out of holes 993 and 994 and is radially sprung so that cross-pin 992 maintains engagement to the holes with friction. Preferably, cross-pin 992 is removed in order to replace bearing surface 900. In other embodiments, cross-pin 992 may be kept in place with threading, adhesive, or another fixture.

Additionally, within recess 950 may be placed a Belleville (or conical spring) washer 995 to help absorb the impacts experienced by bearing surface 900. While a Belleville washer is shown, other impact absorbing devices may be used. For example, springs, fabrics, foams, or another deformable medium. Preferably washer 995 is placed within recess 950 prior to bearing surface 900 being inserted. Additionally, guards 996 and 997 may be placed within recess 950 prior to insertion of bearing surface 900. Preferably guard 996 is position in the bottom of recess 950 and guard 997 is positioned around the interior surface of recess 950. Preferably, guards 996 and 997 protect device 955 from wear during use and replacement of bearing surface 900. Preferably guards 996 and 997 are metal, however they can be made of another material, such as fabric, plastic, or a combination thereof.

Figure 10:
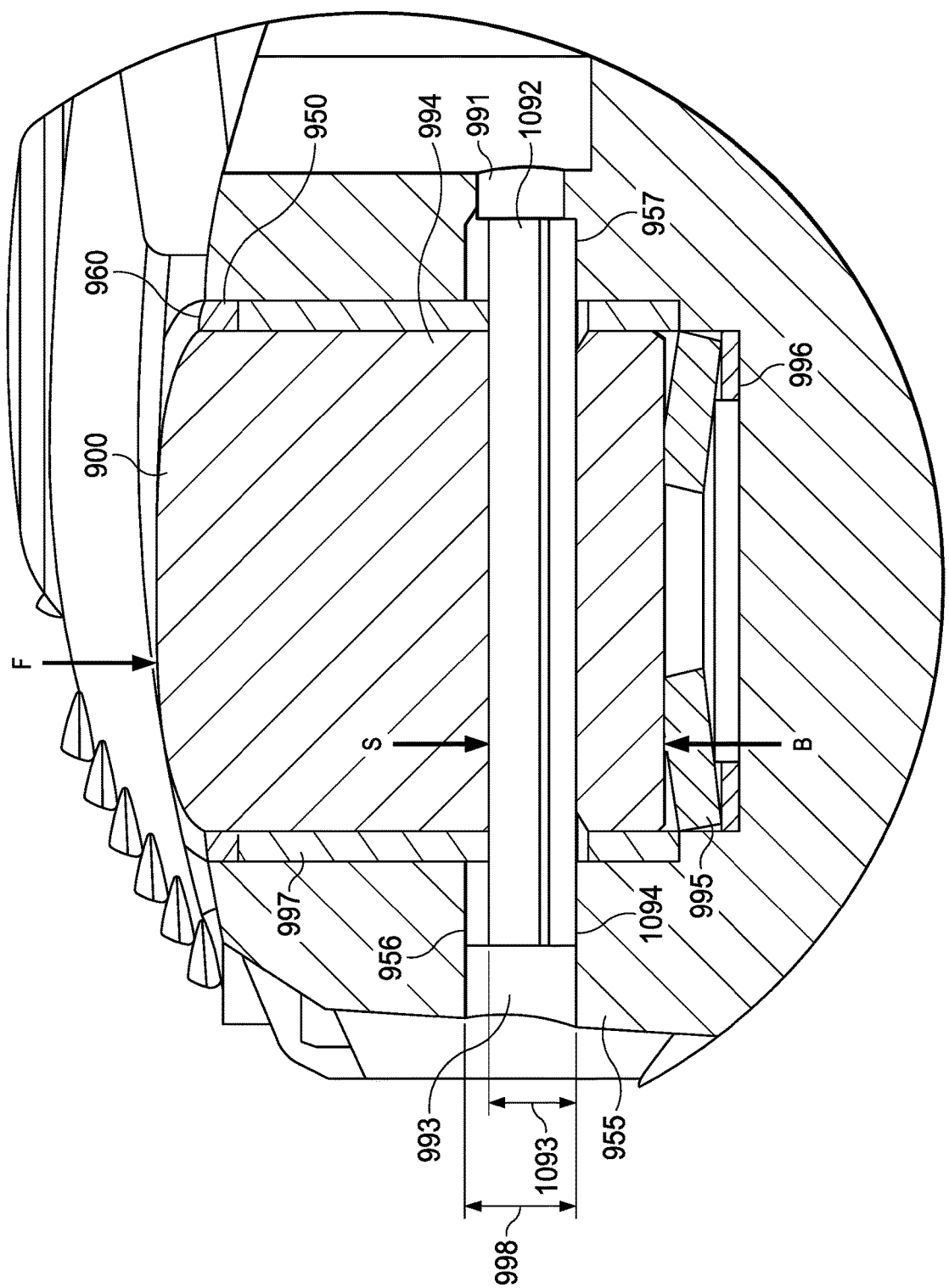

FIG. 10 illustrates a variation of the embodiment in FIG. 9 and the identical structures and reference numbers are the same. Optionally, the bearing surface 900 and the guards 996, 997 are retained by a cross-pin 1092. The cross-pin 1092 may include any of the features/structures previously recited. Optionally, the cross-pin 1092 may be a spring pin, spiral pin, or roll-pin that is positioned or driven into the hole 993 in the device 955, the hole 994 in the bearing surface 900, and possibly extending at least partially into the cavity 991.

As illustrated in FIG. 10, the hole 993 is defined by a top surface 956, a bottom surface 957 and includes a first diameter 998. The cross-pin 1092 may have a second diameter 1093 that is equal to or smaller than the first diameter 998 of the hole 993.

The diameter 998 of the hole 993 relative to the diameter 1093 of the cross-pin 1092 may provide several advantages. For example, as illustrated in FIG. 10, when a force F is applied to the bearing surface 900, the force F urges the bearing surface 900 against the biasing force B provided by the washer 995. As the force F increases, the bearing surface 900 may move downward towards the washer 995, causing the biasing force B to increase. The biasing force B of the washer 995 may be selected as a function of the anticipated force F applied to the bearing surface 900 during operation. Optionally, if the force F is sufficiently large so as to collapse the washer 995, the diameter 1093 of the cross-pin 1092 and the alignment of the cross-pin 1092 in the hole 993 is such that a surface 1094 of the cross-pin 1092 does not contact the bottom surface 957 of the hole 993 or only just contacts the bottom surface 957 of the hole 993. "Just contacts" means for purposes of this application that a shear force S applied to the cross-pin 1092 via the force F as transmitted through the bearing surface 900 is at least less than a shear force required to shear the cross-pin 1092 and, optionally the shear force S is zero (i.e., there is no shear force applied because the cross-pin 1092 does not come into contact with the bottom surface 957 of the hole 955).

In other words, a spring constant of the washer 995, a yield point in shear for the cross-pin 1092, and the dimensions of the diameter 998 of the hole 993 and the diameter 1093 of the cross-pin 1092 are all functions of the anticipated force F to be applied to the bearing surface 900.

When the bearing surface is not loaded, i.e., no force F is applied to the bearing surface 900, the washer 955 urges the bearing surface 955 upwards. (This position is not illustrated but is understandable by one of skill in the art when reviewed in the context of the preceding paragraphs and FIG. 10.) The biasing force B may be sufficient to urge the surface 1094 of the cross-pin 1092 to contact the top surface 956 of the hole 955. With the biasing force B of the washer 955 urging the cross-pin 1092 upward, the cross-pin 1092 may be retained within the hole 955 and thereby retain the bearing surface 900 within the recess 950.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. A low-friction, abrasion resistant system of replaceable bearing surfaces, comprising:
  a device with at least one recess with a wall, the at least one recess including a first hole in the wall, the first hole having a first diameter;

at least one bearing surface configured to be inserted into and removed from the at least one recess, the at least one bearing surface including a second hole with a second diameter that is less than the first diameter;

at least one cross-pin configured to be positioned within the first hole and the second hole; and, at least one washer positioned within the recess and configured to provide a biasing force to urge the bearing surface upward.

2. The system of claim 1, wherein a surface of the least one cross-pin is configured to at least one of a) not contact and b) just contact a bottom surface of the first hole of the device when a force is applied to the bearing surface.

3. The system of claim 1, wherein the biasing force of the washer urges a surface of the at least one cross-pin into contact with a top surface of the first hole of the device when no force is applied to the bearing surface.

4. The system of claim 1, wherein the bearing surface is comprised of one of a steel and a Polycrystalline Diamond Compact (PDC).

5. The system of claim 1, wherein the washer is one of a conical spring and a Belleville washer.

6. The system of claim 1, further comprising at least one guard positioned within the recess between the bearing surface and the device.

7. The system of claim 1, wherein the bearing surface includes a domed outer surface.

8. The system of claim 7, wherein the outer surface of the bearing surface extends beyond an external surface of the device.

9. The system of claim 1, wherein the device is one of a drill bit, a reamer, a cam shaft, a bearing, or an axle.

10. The system of claim 1, wherein the cross-pin is at least one of a spiral pin, a roll pin, and a spring pin.

11. A method of replacing a bearing surface in a device, comprising:

obtaining the device with at least one recess with a wall, the at least one recess including a first hole in the wall, the first hole having a first diameter;

removing the bearing surface from the recess;

inserting at least one washer within the recess, the at least one washer being configured to provide a biasing force;

obtaining a replacement bearing surface, the replacement bearing surface including a second hole with a second diameter that is less than the first diameter;

inserting the replacement bearing surface into the at least one recess; and, inserting at least one cross-pin into the first hole and the second hole.

12. The method of claim 11, wherein the washer is inserted such that the biasing force of the washer urges a surface of the at least one cross-pin into contact with a top surface of the first hole of the device.

13. The method of claim 11, wherein the bearing surface is comprised of one of a steel and a Polycrystalline Diamond Compact (PDC).

14. The method of claim 11, wherein the washer is one of a conical spring and a Belleville washer.

15. The method of claim 11, further comprising at least one guard positioned within the recess between the bearing surface and the device.

16. The method of claim 11, wherein the bearing surface includes a domed outer surface.

17. The method of claim 16, wherein the outer surface of the bearing surface extends beyond an external surface of the device.

18. The method of claim 11, wherein the device is one of a drill bit, a reamer, a cam shaft, a bearing, or an axle.

19. The method of claim 11, wherein the cross-pin is at least one of a spiral pin, a roll pin, and a spring pin.

* * * * *